May 22, 1928. 1,671,069
G. F. DE WEIN
VALVE
Filed Jan. 21, 1924   2 Sheets-Sheet 1
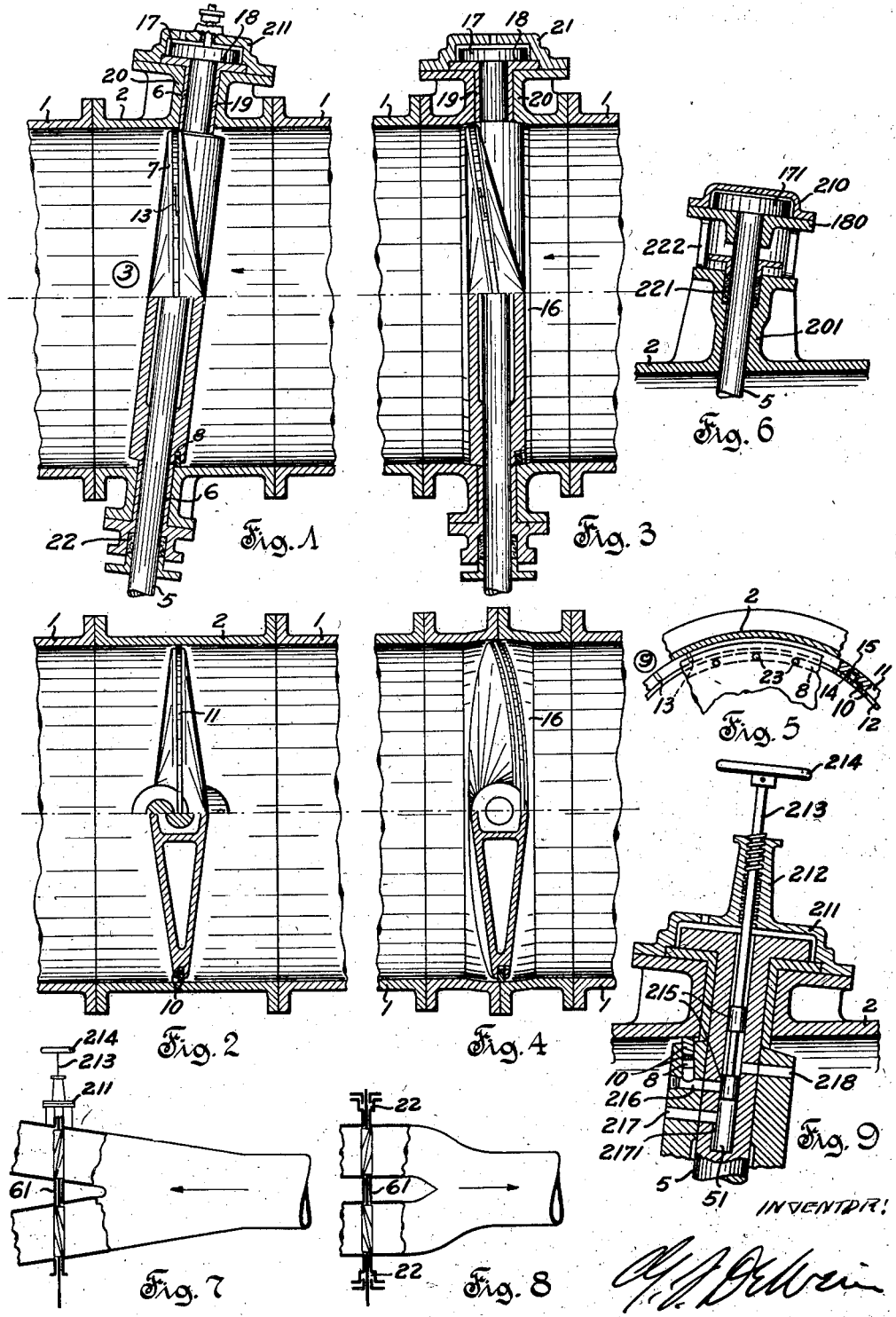

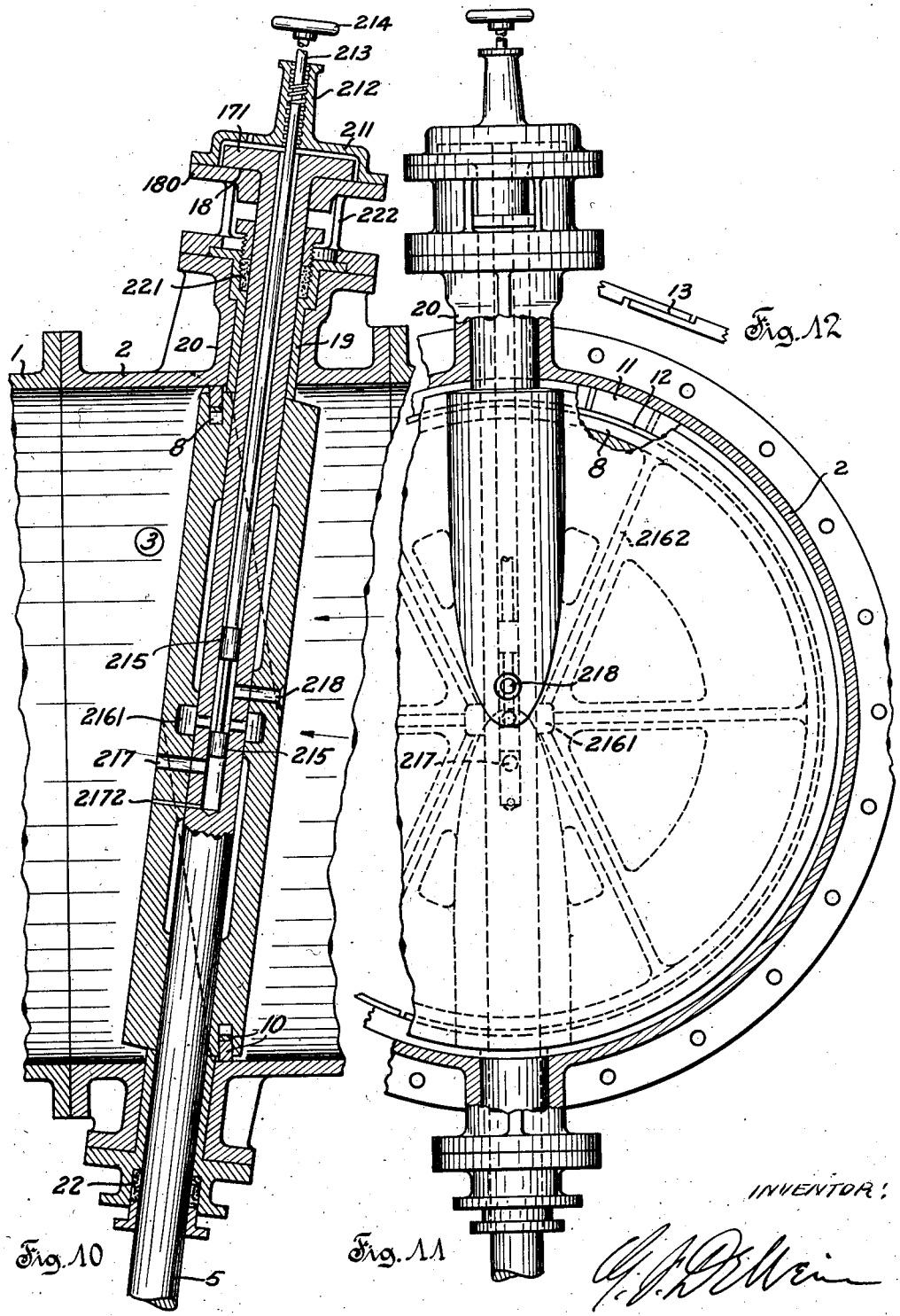

Patented May 22, 1928.

1,671,069

UNITED STATES PATENT OFFICE.

GEORGE F. DE WEIN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

VALVE.

Application filed January 21, 1924. Serial No. 687,505.

This invention relates to valves specifically popularly known as butterfly valves, but more properly speaking, to valves of the stovepipe damper type.

The object of the invention is to more efficiently pack such a valve to prevent the flow of fluid when the valve is closed.

It is common, especially in the hydraulic art, to have valves of this type in which the operating stem is located in the plane of the disk diametrically thereof so that the periphery of the disk is interrupted at two places by the ends of the stem which project for the purpose of mounting the stem and valve in a pipe or other conduit. It is customary in such valves, to groove the exposed periphery of the valve and mount therein two or more arcuate packing strips terminating at the stem ends where it is difficult to effect complete packing of the valve. The reason for this is probably because it is practically impossible to design the packing strips of the correct length to accommodate the variables involved, such as distortion of the pipe and valve itself, stiffness of strip, and simultaneous closing of those parts of the valve remote from the stem, these being subjected to pressure, on the one side of the stem to close, and on the other side to open, with the usual setting of the valve at a slight angle to normal with reference to the conduit.

By slightly relatively tilting the valve disk and stem so they will not be in the same plane, the entire peripheral edge of the disk may be exposed so that it may be grooved continuously around this periphery for the reception of an entire spring packing ring, or a segmental ring either spring or pressure packed. The disk will thereby be as efficiently packed as the ordinary piston with a spring ring or other continuous ring for packing. Depending on which element of the ordinary valve is tilted, two specific forms result.

If in closed position such a valve has its stem in tilted position in the conduit, with the valve at right angles thereto, the casing need not be split and need not have any spherical interior wall to coact with the valve but may remain cylindrical because, as the latter is rotated on the stem to open position, two points only of the valve will come in contact with the interior wall of the conduit, it being remembered that the circumference of the valve has the same diameter as that of the conduit.

If in closed position such a valve has its stem at right angles to the conduit, the valve will be at an angle to the conduit equal to 90 degrees plus or minus the angle of tilt between the stem and valve depending on which side of the conduit the measuring is done. In this case the valve casing is split in a plane through the stem for the reception of the valve and the mounting of the stem. The casing also has a spherical interior wall to coact with the valve.

In either case, a component of pressure will be set up along the stem when the valve is in closed position. This will ordinarily not be objectionable, and may be taken up by a simple thrust device.

To clearly understand these two cases, it may be supposed that spheres mounted on the stem axes respectively are located within the conduits, the first tangent to the cylindrical conduit, and the second tangent within the spherical zone of the conduit. The spheres may then be supposed to be trimmed down so as to leave only disks with sufficient material to support the packing rings and stems to support the disks. Making a geographical analogy, and considering the trimmed spheres as earths mounted on equatorial diameters, the packing rings may be considered as ecliptics, and this invention may be designated as an ecliptic valve.

One of the more specific objects of the invention is to provide means to control the fluid pressure acting on the packing ring.

Another of the more specific objects of this invention is to provide means for packing the stem at the end thereof where the thrust means is located.

Another of the more specific objects is to arrange two of the valves reversely so as to balance the end thrust.

For a more complete disclosure of the invention in several embodiments, reference is made to the accompanying drawing forming a part of the specification in which Fig. 1 is a sectional view, partly in elevation, of the preferred form of the invention presented as a complete valve body and conduit with the valve at right angles to the conduit, taken through the conduit axis.

Fig. 2 is a similar view of the same valve in a plane at right angles to the showing in Fig. 1 and also through the conduit axis.

Fig. 3 is a similar view to that of Fig. 1, of a modification, with the stem at right angles to the conduit.

Fig. 4 is a similar view to that of Fig. 2, of the same modification.

Fig. 5 is a sectional view of a fragment of the valve, packing and casing of the modification of Figs. 3 and 4.

Fig. 6 is a sectional view of a detail showing the means for packing the stem at the thrust means end thereof.

Fig. 7 is a diagrammatic view partly in section of a branch or multiple conduit having two reversely set valves of the kind shown in Figs. 1 and 2.

Fig. 8 is a similar view of such a conduit with reversely set valves of the kind shown in Figs. 3 and 4.

Fig. 9 is a sectional enlarged view of the pressure control detail of Figs. 1, 2 and 10.

Fig. 10 is a sectional view of a complete valve body and conduit, combining the showings of Figs. 1, 2, 6 and 9, and extending near the center of the valve the pressure control for the packing so as to attain a better distribution of the pressure to various places along the packing ring.

Fig. 11 is an elevation partly in section of the valve of Fig. 10.

Fig. 12 is a face view of the packing surface of a fragment of the outer packing ring at the Z-joint.

The same reference characters are used to designate the same parts in the several figures of the drawing.

In the drawing, a conduit or pipe 1 is provided with a valve casing 2, within which is a disk valve 3, carried by a stem comprising a shaft 5 mounted in bearings 6, 6, in the casing 2. The periphery 7 of the valve is formed with a recess 8, accommodating a flexible packing comprising a ring 10 which may be comprised of a primary spring one-piece packing ring 11 and a secondary or auxiliary packing ring 12 within. The primary ring 11 forms a continuous contact portion by being formed with a Z-joint 13. The secondary ring 12 is locked to the primary ring by means of a pin 14 in one taking into a recess 15 in the other, as more clearly shown in Fig. 5. While the packing 10 is desirable, it is not absolutely necessary as the disk itself could have a sharp circular edge forming the contact portion. It is to be understood that in any case the disk may be circular as also the recess 8, packing 10 and the pipe 1 itself. The packing 10 could also be in segments with a plurality of Z-joints, it being obvious that in any case the inner secondary ring 12 is designed to cover the joints with its own joint lying between joints of the primary ring 11.

An essential feature is that the disk valve 3 be set on its stem at a slight angle so that the contact portion of the valve or the packing if that be used, at least clears from coincidence with the ends of the stem.

In the modification of Figs. 1, 2, 6, 7, 9 and 10, the disk valve 3 in its closed position lies at right angles to the conduit 1, thus bringing the stem at an angle to the conduit 1 equal to a right angle plus or minus the slight angle between the valve and stem according to which side of the pipe the measurement is made. Packing ring 11 will here preferably have a cylindrical contact face.

In the modification of Figs. 3, 4 and 8, the stem is set at right angles to the conduit 1, and the disk valve 3 is slightly larger than the conduit and its closed position lies at an angle across the conduit. In this case it is necessary, because of this angle and size of the disk valve, that the conduit be formed with a spherical zone portion 16 having a diameter corresponding to that of the larger disk valve and of course larger than that of the conduit. It immediately follows from this necessity, that the casing be split diametrically through the spherical portion and preferably in a plane through the shaft axis, it being shown in the drawing as rectangularly of the conduit. Packing ring 11 will here preferably have a spherical contact face.

In both modifications, it will be seen that the pressure on the disk valve 3 is normal to its plane. Assuming that the fluid flow when the valve is open is as indicated by the arrow in Figs. 1 and 3, the pressure on the valve will be from the right. But as this pressure is reacted mainly by the bearings 6, 6, and as these are at an angle to the plane of the disk valve 3, the valve will tend to slide downwardly (referring to Figs. 1 and 3) along the axis of its stem, and ought therefore, in the larger sizes to be provided with a reaction end thrust device. This is shown in the drawing in the form of a collar 17, on the shaft 5, coacting with a plane surface 18, at right angles to the shaft axis, forming the end of the upper of two bushings 19 which may also comprise the renewable portion for the shaft bearings 6, 6. The bushings 19 are set in bosses 20 cast on the valve casing 2, and are held in place by perforated caps 21 bolted in place.

The end thrust set up and thus provided for will be only that part of the total pressure on the disk valve 3 represented by the sine of the small angle between the disk valve 3 and its stem, in other words, the full pressure multiplied by the sine of the angle. Assuming the valve of either Fig. 1 or 3 to be full size and the pressure in the conduit to be 100 pounds per square inch and the angle between the valve and stem as shown, the end pressure on the stem will be about 10 pounds per square inch of cross section of the conduit. It is necessary to take a slight correction into account in that the end pressure will be slightly less by the amount of the conduit pressure multiplied by the area of cross section of shaft 5. This is because the outer upper end of the stem is subject to atmospheric pressure.

The lower end of the stem is shown packed by gland 22, but this may be considered an unnecessary refinement as being on the exhaust side of the valve. If found desirable the upper end of the stem may be packed as shown in Fig. 6. Here the boss 201 is formed with a packing gland 221 and is extended by arcuate walls 222, supporting a thrust plate 180 with which coacts the collar 171 on the extended upper end of stem. An unperforated cap 210 is fastened to the thrust plate. With this construction the thrust device is not subjected to the effects of any leakage that may ensue when the stem is not specially packed.

In some cases where the conduit controlled by the valve could be made multiple, as shown in Figs. 7 and 8, two valves may be reversely mounted on the same stem so that the end thrust set up on one valve will balance the end thrust on the other. In Fig. 7 valves similar to that of Fig. 1 are used and this will bring the branches of the multiple conduit at an angle to each other of twice the angle between the valve and stem. In Fig. 8 valves similar to that of Fig. 3 are used and this will bring the branches of the multiple conduit parallel to each other. If both kinds of valve are used together, the branches of the multiple conduit would be equal to the angle between the valve and stem.

In both Figs. 7 and 8 the branch conduits are shown connected by common bearing 61 and this being subjected to the pressure in the form shown in Fig. 7, packing is unnecessary for the stem ends. If the pressure is as shown in Fig. 8, packing glands 22 for the stem ends would be desirable.

The packing ring 10 for the disk valve 3 in the modification shown in Fig. 3 is pressure packed without control and so made would be serviceable for smaller valves. This could be used for the valve of Fig. 1, if desired. This is more clearly shown in Fig. 5. The recess 8 in the periphery 7 of the valve 3 has ports 23 communicating to the bottom thereof from the pressure side of the valve.

A controlled pressure packing is preferably used with larger valves. This is more clearly illustrated in Fig. 9. The cap 211 has a central boss 212 centrally bored and screw-threaded to accommodate a threaded valve stem 213 extending within a central bore 51 in the shaft 5 and bearing at its upper end a hand wheel 214 and at its lower end formed as a double piston valve 215. A port 216 leads to the packing ring 10; another port 217 to the exhaust side of the valve; and a third port 218 from the pressure side of the valve. These ports connect with the bore 51 in the shaft 5 in such a way that the annular recess between the pistons of valve 215 may connect the packing ring 10 with the pressure side of the disk valve or to the exhaust side. A release passage 2171 is provided in the side of bore 51 between its end and exhaust port 217.

This controlled pressure packing shown in detail in Fig. 9 indicates broadly how this can be accomplished by admitting pressure to and exhausting from one place along the packing ring 10. A more complete showing of how this might be better distributed is made in Figs. 10 and 11. Here the bore 51 extends to the middle of the disk valve 3 where it connects with an annular chamber 2161 by means of ports 216. The annular chamber then connects by radiating passage 2162 to recess 8 in the disk valve 3 at different points for better distribution of pressure and exhaust. Release passage 2172 in this case is a bore from the exhaust side of the valve to the bottom of bore 51.

The embodiment of the invention as shown in Fig. 10, may be considered as the valve of Fig. 1, with the thrust device placed as in Fig. 6 so as to accommodate a gland packing formed directly in the bearing bushing 19.

There is nothing special to be said as to the operation of the valve when made without the pressure control of the packing; it operates just like any usual butterfly valve. One attribute might be referred to, however, in that when the valve of Fig. 1 is first opened, the packing ring first springs in slightly because of its width, and after the diagonal across the ring begins to leave contact with the valve casing at remote points from the shaft, the ring springs out again. The valve packing of Fig. 3 will not operate in this manner because the valve works in a spherical zone.

When the pressure control of the packing is used in either type of valve, the operation is special only in applying the pressure by turning the hand wheel so as to position the valve 215 to connect pressure port 218 with packing ring port 216. The packing ring 10 will then be forced tightly in place within the valve casing 2 and there will be no leakage past the disk valve 3. Before opening the disk valve, the pressure is released through exhaust port 217, after which the packing ring will spring in away from the casing, and the disk valve can easily be opened.

It should be understood that it is not desired to limit the invention to the exact details of construction herein shown and described, for various modifications may occur to persons skilled in the art.

It is claimed and desired to secure by Letters Patent:

1. A valve comprising a stem having spaced supports, and a disk rigidly attached to said stem between said supports, the plane of said disk forming an acute angle with the axis of said stem.

2. A valve comprising a stem supported at its opposite ends and rotatable about an axis, and a disk rigidly attached to the medial portion of said stem and rotatable therewith, the plane of said disk forming an acute angle with said axis.

3. A valve comprising a casing forming a conduit, a stem supported at opposite sides of said casing and having an axis extending across said conduit, and a valve disk supported by and rotatable only about the axis of said stem, the plane of said disk forming an acute angle with said axis.

4. A valve comprising a casing forming a conduit, a stem supported at opposite sides of said casing and having an axis extending across said conduit, and a disk having an annular seating portion engageable with a cylindrical surface of said conduit, said seating portion lying in a plane fixed relatively to said stem and intersecting the axis thereof.

5. A valve comprising a casing forming a conduit bounded by a cylindrical surface, a disk restrained on and swingable about an axis extending transversely across said conduit surface, and a continuous annular packing associated with the periphery of said disk and formed for surface engagement with said cylindrical conduit surface when the valve is closed.

6. A valve comprising a casing forming a conduit bounded by a cylindrical surface, a disk restrained on and swingable about an axis extending transversely across said conduit surface, and a continuous annular packing associated with the periphery of said disk and completely surrounding said axis, said packing having a cylindrical outer surface engageable with said cylindrical conduit surface when the valve is closed.

7. A valve comprising a casing forming a conduit, a stem supported by journals on opposite sides of said conduit, and a disk rigidly attached to said stem between said journals, the plane of said disk forming an acute angle with said stem.

8. A valve comprising a casing forming a conduit of circular cross section, a stem extending across said conduit, and a substantially circular valve disk associated with and swingable about the axis of said stem, the plane of said disk forming a fixed acute angle with and intersecting the axis of said stem.

9. A valve comprising a casing forming a conduit, and a disk supported by journals on opposite sides of said conduit, the axis of said journals forming a fixed acute angle with the plane of said disk.

10. A valve comprising a casing forming a conduit of circular cross section, and a substantially circular disk supported by alined journals located on opposite sides of said conduit, the axis of said journals intersecting and forming a fixed acute angle with the plane of said disk.

11. A valve comprising a casing forming a conduit, a disk movable only about an axis intersecting the plane of said disk whereby the plane of said disk is coincident with the conduit axis in open position and at right angles to the conduit axis in closed position.

12. A valve comprising a casing forming a conduit, a disk movable within said casing about an axis forming an acute angle relatively to the plane of the disk, and fluid pressure distortable means for sealing the joint between said casing and said disk when the valve is closed.

13. A valve comprising a casing forming a conduit, a stem extending across said conduit, the axis of said stem forming an acute angle with the central axis of said conduit, and an oscillatable disk supported by said stem and having the plane of said disk disposed at right angles to said conduit axis when the valve is closed.

14. A valve comprising a casing forming a straight-away conduit, a disk movable about an axis forming an acute angle with the central axis of said conduit and with the plane of said disk, and a one-piece packing ring coacting with said disk and engageable with a continuous surface of said conduit when the valve is closed.

15. A valve comprising a casing forming a cylindrical conduit, a disk movable about an axis forming an acute angle relatively to the plane of the disk, a one-piece packing ring coacting with said disk and with said casing, and an auxiliary packing ring coacting with said one-piece packing and with said disk.

16. A valve comprising a casing forming a cylindrical conduit, a disk movable within said casing about an axis extending transversely of said conduit and at an angle to said disk, and a circular flexible fluid pressure distortable packing element coacting with the periphery of said disk and with the inner surface of said conduit.

17. A valve comprising a casing forming a conduit, a disk movable within said casing about an axis extending transversely of said conduit, and a single packing element cooperating with said casing and with said disk at places lying in a plane intersecting the axis of movement of said disk.

18. A valve comprising a casing forming a conduit, a disk movable about an axis forming an acute angle with the plane of said disk, a continuous flexible packing coacting with said disk and said casing, and valve means for controlling the admission and exhaust of fluid under pressure to and from a surface of said packing causing the latter to seal and unseal the joint between said disk and said casing.

19. A valve comprising a casing forming a conduit, a disk movable about an axis forming an acute angle with the plane of said disk, a continuous flexible packing carried by said disk and engageable with said casing, and valve means for controlling admission and exhaust of fluid under pressure to and from a surface of said packing causing the latter to seal and release the joint between said valve and said casing.

20. In combination, a casing forming segregated conduits, a disk valve for controlling the flow of fluid through each of said conduits, each of said valves being oscillatable about an axis forming an acute angle with the plane of the disks to produce unbalanced pressures opposite in direction, and means rigidly connecting said valves.

21. In combination, means forming a two-part conduit, a butterfly valve oscillatable in each of said conduit parts, each of said valves forming an acute angle with the axis of oscillation thereof, and means rigidly connecting said valves.

22. In combination, a casing forming adjacent conduits, a disk oscillatable in each of said conduits about an axis forming an acute angle with the plane of the disk, and a direct mechanical connection between said disks.

23. The combination of two adjacent conduits, a valve in each of said conduits of the type comprising a disk rotatable on an axis at an acute angle thereto, and a common stem for the valves lying in said axis.

24. The combination of a conduit, a disk valve therein, a stem for said valve, a pressure packing carried by said valve, said valve having means connecting said packing respectively to a source of pressure and to exhaust, and means for controlling said connecting means for alternately permitting application or release of said pressure.

25. The combination of a conduit, a disk valve therein, a stem for said valve at an acute angle to said valve, said valve having a recess and having passages respectively connecting said recess to a pressure source and to exhaust, a packing in said recess, and means for controlling said passages for alternate admission to and release of pressure in said recess.

26. The combination of a conduit, a disk valve therein, a stem for said valve at an acute angle to said valve, said valve having a recess and having passages respectively connecting said recess at distributed points thereof to a pressure source and to exhaust, a packing in said recess, and means for controlling said passages for alternate admission to and release of pressure in said recess.

27. A valve comprising a casing forming a conduit, and a disk movable only around a fixed axis supported at opposite sides of and extending transversely across said conduit, said axis forming an acute angle with the plane of said disk.

28. A valve comprising a casing forming a conduit, a disk movable about an axis extending transversely across said conduit and forming an acute angle relatively to the plane of said disk, and flexible packing carried by said disk and engageable with the inner surface of said conduit.

29. A valve comprising a casing forming a conduit, a disk movable about an axis extending transversely across said conduit and forming an acute angle relatively to the plane of said disk, and flexible packing carried by said disk and engageable with the inner surface of said conduit, said packing being distortable by fluid under pressure to seal the joint between said disk and said casing when the valve is closed.

30. A valve comprising a casing forming a conduit, a disk movable about an axis extending transversely across said conduit and forming an acute angle relatively to the plane of said disk, flexible packing carried by said disk and engageable with the inner surface of said conduit, said packing being distortable by fluid under pressure to seal the joint between said disk and said casing when the valve is closed, and means for relieving pressure from distorting said packing prior to opening said valve.

31. A valve comprising a casing forming a conduit, a disk movable about an axis extending transversely across said conduit and forming an acute angle relatively to the plane of said disk, and means for balancing pressures acting upon said disk in the direction of the axis of movement thereof.

In testimony whereof, the signature of the inventor is affixed hereto.

G. F. DE WEIN.